Aug. 24, 1948.   J. B. RUST   2,447,876
AQUEOUS DISPERSIONS OF BUTADIENE POLYMERS
AND TREATMENT OF WOOL THEREWITH
Filed April 3, 1945

Fig. 1.

Inventor
John B. Rust,
By Sol Shappirio
Attorney

UNITED STATES PATENT OFFICE 2,447,876

AQUEOUS DISPERSIONS OF BUTADIENE POLYMERS AND TREATMENT OF WOOL THEREWITH

John B. Rust, Montclair, N. J., assignor to Montclair Research Corporation, a corporation of New Jersey Application April 3, 1945, Serial No. 586,293

5 Claims. (Cl. 260—29.7)

This invention relates to fiber treatment and particularly to processes of treating woolen fabrics to reduce substantially the shrinkage of the wool, to products obtained by such processes of treatment, and to baths and compositions utilized in such treatment.

It is known that it is possible to produce non-felting and non-shrinking wool by chlorination or bromination of wool. There have also been described processes of producing non-felting wool by treatment with alcohol solutions of alkalis, by treatment with sulfuryl chloride, nitrosyl chloride, and the like.

Treatment with rubber latex in the presence of quaternary ammonium, phosphonium, sulfonium compounds and the application of alkylated methylol melamine at relatively high temperatures have also been described.

In the prior art processes difficulties are encountered, including danger of damage to fibers reducing wearing qualities and undesirable hand, which difficulties are hard to prevent in most of the prior art processes. Processes have also been suggested for the use of synthetic resins such as methacrylate resins, acrylate resins, vinyl resins, styrene resins, butadiene copolymers and polymers and so forth, for the treatment of a wide variety of fibers. These suggestions in the art treat all these polymeric substances as equivalent for all fibers, but investigation proves that such suggestions are erroneous because while such resins and polymers can be applied to wool for example, they are not equally efficacious in effecting a shrink-proofing effect. Effective shrink-proofing requires definite conditions and compositions and the determination of such conditions and composition is a matter that cannot be predicted with reasonable certainty, but is determinable by investigation and research only.

In a great many of these prior art processes, especially those wherein a resin or polymer is applied to cloth and more specifically to woolen cloth, by a process of exhaustion of the polymer onto the fiber, great pains have been taken to cause this deposition or exhaustion to take place under acid conditions. Some authors and inventors claim that for the best deposition of resins on woolen fibers, the pH of the bath should be at or near the isoelectric point of the wool. In order to obtain acidities whose pH is in the vicinity of its isoelectric point, the prior art has utilized various means of stabilizing the emulsions at this point, as for instance, by the use of powerful emulsifying agents such as sodium lauryl sulfate, sodium dioctyl sulfosuccinate, alkaryl sulfonic acids and their salts, quaternary ammonium, sulfonium and phosphonium halides and the like.

In prior application, Serial No. 537,537, filed May 26, 1944, entitled Woolen treatment and products therefor, in the name of John B. Rust, it has been disclosed that no shrink-proofing effect whatever is obtained unless a straight butadiene polymer is used, or some polymer in which butadiene is present to a major extent. The present invention is a continuation of the work leading to effective shrink-proofing of fibers, specifically wool.

This application is a continuation-in-part of application Serial No. 537,537, filed May 26, 1944, and of application Serial No. 563,791, filed November 16, 1944.

Among the objects of the present invention is the treatment of wool and wool containing fibers to render them substantially resistant to felting, fulling and shrinkage, by relatively simple processes and particularly where the danger of damage to fibers resulting in reduction of wearing qualities and undesirable hand are eliminated.

Other objects include the production of treating baths enabling the conditioning of wool to produce products of the character set forth above.

Other objects include the wool products themselves resulting from such methods of treatment.

Other and further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In connection with that more detailed description, there is shown in the accompanying drawing, graphs illustrating the exhaustion time of the bath against percentages of salt at particular temperatures.

In accordance with the present invention, it has been found that the wool may desirably be treated in or with a bath that contains an aqueous emulsion or dispersion of a polymeric butadiene derivative and a soap alone as the essential emulsifying agent, the soap being an alkali salt of a long chain carboxyl acid. In such a bath, it has been found that considerable deposition of the polymer on the wool occurs even in the absence of a conditioning electrolyte. Toward the end of exhaustion of the polymer on the fiber, it is desirable to aid the deposition by the addition of an electrolyte. It is noteworthy to observe that no acid need be employed to reduce the pH of the bath, nor on the other hand is a conditioning electrolyte of any description necessary in the first steps of the deposition of the polymer on the cloth or fiber, provided that the emulsifying agent is a soap as set forth above. And this is particularly in distinction to the former processes of the prior art which practically unanimously require a low pH, a strong emulsifying agent, and a salt.

As a matter of fact, superior deposition of the polymer on the wool fabric may be obtained to secure shrink-proofing results by adjusting the bath to a pH of substantially 7 or higher, as for example, a pH of around 8, etc.

As exemplary of the different methods of application of the soap emulsions, the following may be noted generally. One such method is the application of the soap emulsion or dispersion of the polymer, using a salt alone with no acids. Another method is the application of the emulsion or dispersion using acid alone. Still another method is the pretreatment of wool with acid followed by the application of the soap emulsion or dispersion, and the use of an electrolyte. All such methods are utilizable in producing satisfactory products. The choice of any particular process for use may depend on various factors such as the nature of the woolen article to be treated, the condition and nature of the wool itself, etc.

Where conditioning electrolytes such as salts are employed in the later phases of the exhaustion of the bath, water-soluble salts may be used as the electrolyte, desirably such salts which do not precipitate the polymer. Neutral salts, specifically salts of strong bases and strong acids, particularly inorganic salts are preferred. The following are exemplary: sodium sulfate, sodium chloride, sodium bromide, sodium iodide, sodium phosphate, sodium sulfamate, sodium sulfite, sodium bisulfate, sodium bisulfite, sodium nitrate, sodium acetate, and the like, or salts of the above using potassium, lithium, caesium, and so forth, in place of sodium. Salts like zinc chloride may also be used where the coagulation does not appear to be too serious since it occurs in small particulate form, and the particles may be redispersed by stirring.

Where acids are employed they may be inorganic or organic acids or strongly acid salts, for example hydrochloric acid, sulfuric acid, phosphoric acid, formic acid, acetic acid, propionic acid, oxalic acid, sodium bisulfate, etc.

Where acids are used in the method that includes pretreatment of the wool, any of the acids or acid salts as set forth immediately above may be employed. The wool in this case is heated with this acid for a short period of time and then either rinsed before treatment with the soap emulsion, or the acid allowed to remain in contact with the wool, and the butadiene polymer emulsion added thereto. In this manner there is usually obtained a very even exhaustion and deposition of the emulsion on the wool, with subsequent excellent shrink-proofing characteristics.

The alternative procedure of the present invention, wherein acid alone is used and which was described above, is perfectly satisfactory in the case where acids are employed. Usually from 1% acid, based upon the weight of the wool, to almost 100% acid may be used. The percentage of acid will depend to a great degree upon the strength of the acid, thus in the case of acetic acid we may use up to around 100% of acid, based upon the wool, whereas in the case of sulfuric acid, it is preferred to use less than 10%.

Thus, the process of the present invention comprises the exhaustion of a soap emulsion of a butadiene polymer, or copolymer on wool, in the presence of acid alone, or alternatively in the presence of a conditioning electrolyte alone. However, the use of small amounts of both acid and electrolyte is not precluded.

The term "conditioning electrolyte" may be used to cover such electrolytes as are indicated above which may be used to produce deposition of the polymer or final exhaustion of the bath as explained above. And while as set forth above, the electrolyte may be added in later stages, it is also permissible to utilize such electrolytes in the bath itself containing the soap emulsion of the polymeric butadiene derivative. In any event, it is possible to carry out the process of exhausting the polymer on the wool by the use of the salt alone without any acidification, as for example, by the use of Glauber's salt or other stated electrolyte alone, or by the use of acidification alone as explained above. Some differences in the methods using a salt and using an acid may be noted as illustrated in Examples 2 and 3 hereunder. The application with acid alone may require a longer exhaustion time and the shrink-proofing qualities may not be quite as good, but the procedure is none the less satisfactory in producing adequate shrink-proofing. When acidification is used, either in the final stages or initially in the conditioning of the bath, the pH of the bath will not be 7 or above and on the alkaline side, the conditions which are preferred when salt type electrolytes are employed.

An important phase of the invention where soap emulsions of the character set forth are employed, is the fact that the woolen fabric or other fiber being treated, may be pretreated with the electrolyte before the fabric is treated with the soap emulsion. For example, when exhaustion is carried out in the presence of acid only, it has been found preferable to pretreat the woolen fabric with the acid and then treat with the soap emulsion. This is particularly true in such cases where the wool is resistant to exhaustion of the butadiene polymer emulsions, in which event it is found that when pretreated with acid, uniformity of action takes place, the fiber takes up the soap emulsion with great ease, and has imparted to it excellent shrink-proofing properties. It is possible that by pretreatment in this manner, the electrical charge on the wool is changed and allows the deposition of the polymer to occur much more readily but whatever the explanation may be, such pretreatment has been found to give excellent results.

Surprisingly, it has been found that an antioxidant has a very direct and important effect in enhancing shrink-proofing and other desirable qualities in the treated wool. These antioxidants may vary in character but generally are the phenols and amines particularly of aromatic character such as monobenzyl ether of hydroquinone, phenyl β-naphthylamine, p-hydroxyphenyl glycine, etc. The amount present should be sufficient to secure the results desired, small amounts as from 1% to 5% on the weight of the polymer usually being sufficient not only to improve shrink-proofing extensively but to give the treated product increased heat resistance, etc. For instance with a 3% application of a soap emulsion of butadiene polymer containing 1½% of monobenzyl ether of hydroquinone, a 5% shrinkage in the warp was found after 10 washings at 105° F. for 10 minutes. In a similar fabric containing the same amount of butadiene polymer but containing no monobenzyl ether of hydroquinone, a 17% shrinkage in the warp was found. The effect of the antioxidant on shrinkproofing results obtained is therefore, important and noteworthy. Other examples will be given below.

While the use of such antioxidants in obtaining very excellent and permanent shrink-proofing results has been emphasized above in connection with the soap emulsions or dispersions, this aspect of the invention is not limited thereto, since the use of antioxidant in this way may be carried out with other types of emulsions or dispersions employing other emulsifying agents such as sodium lauryl sulfate, sodium dioctyl sulfosuccinate, alkaryl sulfonic acids and their salts, quaternary ammonium, sulfonium, and phosphonium halides and the like.

Thus the use of the soap emulsions of the polymeric butadiene derivative is particularly important in the shrink-proofing of wool because of the results obtained which include a number of considerations of importance in the art. The emulsion can be made much more readily than the emulsions using the more powerful emulsifying agents. The application to wool appears to take place more smoothly and without requiring the use of so large amounts of salts or acids as prior art processes required. Further the emulsions appear to have a greater degree of stability than those from other emulsifying agents.

In carrying out the process, the wool either as raw wool, yarn, knit, woven goods or mixed goods, is entered into an aqueous bath of the character set forth above followed by exhaustion of the bath on the fiber. The bath desirably should contain the polymer in an amount to give under the conditions of treatment, a wool having from 1 to 25% of polymer based on the weight of the wool.

It is both startling and noteworthy that straight butadiene polymers or butadiene homologue polymers give notably superior, non-felting effects than do butadiene copolymers and for this reason the polymeric derivatives from butadiene alone or butadiene homologues alone, are preferred to the copolymers. The term "straight" is used in this specification to mean such polymers produced from a butadiene or its homologue without interpolymerization with other unsaturated non-butadiene type compounds. The polymeric butadiene derivatives may be for example, the polymers of butadiene and its lower homologues such as isoprene, dimethyl butadiene, ethyl butadiene, ethoxy and methoxy butadiene, cyanobutadiene, and the like, particularly butadiene-1.3 and its derivatives, since as stated, these produce a much superior non-felting effect than the substantial copolymers with vinyl compounds. So that when an interpolymer or interpolymeric derivative of butadiene is employed in the process, it is desirable to keep the interpolymerizing component in minor proportion, as for example, below 50%. Thus in employing styrene it is best to keep the styrene somewhere below 20% or 30% of the interpolymer. In the case of methyl methacrylate below 30% is desirable, when using dichlorostyrene below 20% is preferable. These limitations on the interpolymeric component is based on results obtained which show that it is the butadiene type derivative which gives the shrink-proofing effect desired. For example, it has been found that in a series of copolymers of butadiene with methyl methacrylate, as the methyl methacrylate content of the copolymer increased, the non-felting characteristics imparted to the wool fibers decreased so that a butadiene polymer containing no methyl methacrylate renders wool entirely non-felting whereas a straight methyl methacrylate has no effect upon the felting qualities under the same operating conditions. The same results have been found to be true with every vinyl compound tested. However, vinyl compound may be copolymerized with the butadiene or butadiene derivatives to give compositions which render wool non-felting to a satisfactory degree, the amount of vinyl compound present in the copolymer being regulated to give the result desired. As illustrative of such vinyl or related components there may be used vinyl acetate, methyl methacrylate, ethyl acrylate, styrene, acrylo-nitrile, vinyl pyridine, methacrylonitrile, isopropenyl methyl ketone, vinyl phenyl ketone, vinyl methyl ketone, and the like.

Thus a 6% application of an emulsion of an interpolymeric butadiene derivative containing 80% of methacrylic ester will deposit readily on the wool but no shrinkage proofing is obtained in this manner. However, if the methacrylic ester content of the interpolymeric butadiene derivative is decreased to 10% excellent shrinkage proofing is obtained from the treated wool. This effect is both startling and noteworthy since the shrinkage proofing effect is directly proportional to the butadiene concentration in the interpolymer. For example, up to about 20% of methacrylic ester may be used in the interpolymer without any deleterious effect upon the shrinkage proofing efficiency of the emulsion. In fact the proportion of methacrylic ester within the acceptable range appears to have some beneficial effect inasmuch as for example, in some cases increased abrasion resistance is obtained in the treated wool.

Consequently the methacrylate derivative is utilized with the butadiene in producing the interpolymer, so that the amount of methacrylate derivative present, is insufficient to interfere with the desired shrink-proofing effect desired while at the same time the amount of methacrylate derivative is sufficient to give some special effect on properties in the treated wool which would not be obtainable in its absence. The same considerations apply to the other substances mentioned herein that may be interpolymerized with a butadiene.

The operation is desirably carried out at a temperature sufficient to give exhaustion of the bath with the particular emulsion being used. This will vary with different emulsions. While lower temperatures may be used, the operation is desirably carried out at a temperature range from 40° C. up which may go as high as the boiling point of the bath. But it may be pointed out that with the process of this invention residing in the utilization of soap emulsions of butadiene polymers or interpolymers with wool at a pH of 7 or higher and using no conditioning electrolyte in the first steps of the exhaustion of the polymers onto the fibers, excellent shrink-proofing or shrink-resistant woolen fabrics may be obtained with a desirable soft lofty hand and rapid and even exhaustion of the emulsion occurs at relatively low temperatures, so that boiling or the use of excessive amounts of salt is not required.

The procedure to be used and the temperature are largely interdependent, and the choice of one may very well determine the choice of the other. Thus at low temperature, an application with acid alone or with a combination of acid and electrolyte is preferred, while at higher temperatures the use of electrolyte alone is advisable, and the use of excessive amounts of acid at these higher temperatures particularly in combination with electrolyte may have undesirable effects such as coagulation of the polymer in the bath or an excessive speeding up of the exhaustion which often leads to coagulation of the polymer on the wool and to a sticky feeling of the wool material. If acid pretreatment is applied to the wool, the application of the soap emulsions is best carried out with acid alone, regardless of the temperature. However, the amount of acid needed for the pretreatment or for the application decreases with increasing temperature.

The polymer can be applied before or after fulling, weaving, scouring and the like operations. In some cases it can be applied in the dye bath. Mixed goods including wool-cotton, wool-rayon and so forth can be treated by this method without any deleterious effect. If desired the wool may be subjected to a pretreatment, as for example, chlorination or bromination, before being treated in accordance with the present invention.

The treatment of wool fibers is particularly emphasized herein, although animal fibers such as silk and protein fibers such as "Aralac" (a casein fiber) may also be treated in accordance with this invention.

It is particularly noteworthy to observe that in carrying out the processes of the present invention to obtain satisfactory shrink-proofing effects, it is not necessary to use an acid to reduce the pH of the bath, nor on the other hand, is a conditioning electrolyte of any description required in the first steps of the deposition of the polymer or interpolymer on the cloth or other fiber being treated provided however that the emulsifying agent is a soap.

Any desired soap may be employed within the limits set forth above, such soap being an alkali salt of a long chain carboxylic acid. Such acids are preferably those having more than 12 carbon atoms and include the acids such as stearic, oleic, palmitic, myristic, lauric, capric, etc., which are found and derivable from the natural glycerides including the animal and vegetable oils.

It was also possible in the process of the present invention to employ very small amounts of powerful emulsifying agents such as alkali salts of sulphated alcohols and the like, in addition to the soaps. However, it is preferred to keep such additions of the powerful emulsifying agents to a very minimum, such as 1%. In the case of the soap, which is defined as being an alkali salt of a long-chain carboxylic acid, up to 10% may be used. Larger amounts of soap are unnecessary, whereas less than 1% is usually unsuitable for maintaining satisfactory emulsion.

*Example 1.*—A butadiene polymer emulsion was prepared as follows. 105 parts of a buffer solution of pH=11, 0.56 part of ammonium persulfate and 5 parts of soap (known to the trade as Ivory Flakes) were placed in a pressure reactor cooled to below —5° C. The buffer solution consisted of 35.8 parts of disodium phosphate and 7.16 parts of trisodium phosphate dissolved in 980 parts of distilled water. 50 parts of butadiene, which had been passed over calcium chloride and condensed in a second pressure reactor cooled to below —5° C., were now added to the chemicals in the first reactor. The reactor was then sealed and allowed to come to room temperature. It was then placed into an agitator with a constant temperature water bath at 45° C. and shaken for 40 hours. The reactor was taken out, allowed to cool and opened. Only a very slight pressure was observed and no foaming took place when the reactor was opened and thus complete polymerization with a solid content of 33⅓% was indicated.

*Example 2.*—The emulsion made according to Example 1 was applied to a hand knit sample of wool approximately 7" x 5" in size, weighing 15.40 parts. 2.77 parts of the emulsion, an amount containing a weight of solids corresponding to 6% of the weight of the wool sample to be treated, were weighed out and added to 200 parts of water. The bath was conditioned with an electrolyte consisting of 1.0 part anhydrous sodium sulfate. The wool sample was then immersed in the cold bath, and the bath heated to 60–70° C. in the course of about 15 minutes, while the wool sample was agitated continuously. The bath was kept at that temperature for 20 minutes. By that time the bath had cleared up except for a slight haze due to the soap and was considered exhausted. The wool sample was taken out, rinsed with warm water and dried.

The wool sample was then washed for 6 hours in a washing machine containing 25 parts of powdered soap in 13,000 parts of hot water at 70° C. The sample was rinsed and dried. It showed only very slight felting and shrinkage, while an untreated sample, after the same 6 hours of washing, showed very bad felting and shrinkage.

*Example 3.*—The emulsion made according to Example 1 was applied to a hand knit wool sample approximately 7" x 5" in size, weighing 16.50 parts. 2.97 parts of the emulsion, an amount containing a weight of solids corresponding to 6% of the weight of the wool sample, were weighed out and added to 200 parts of water. The bath was conditioned with 1.0 part of 10% sulfuric acid. The wool sample was then immersed in the cold bath and the bath heated to 60–70° C. in the course of approximately 15 minutes, while the wool sample was agitated continuously. The bath was kept at that temperature for 40 minutes, then taken up to 90° C. in the course of 10 minutes and held there for 10 minutes. A moderate haze which had been observed after the 40 minutes at 60–70° C., did not disappear at the higher temperature, and was most likely due to the soap. The bath was considered exhausted, and the wool sample taken out, rinsed with warm water and dried.

The wool sample was then washed for 6 hours in a washing machine containing 25 parts of powdered soap in 13,000 parts of hot water at 70° C. The sample was then rinsed and dried. When examined the sample showed a slight felting and shrinkage, but did not appear to be quite as good as the material treated in Example 2.

It will be noted that in the last example the pH was reduced by addition of acid, but no conditioning electrolyte was employed. However, under the conditions not quite as good shrink-proofing was secured as when the exhaustion of the bath was carried out under neutral or alkaline conditions and a small amount of conditioning electrolyte used.

*Example 4.*—A butadiene polymer emulsion was prepared as follows. 3.5 parts of soap (sodium salt of coconut oil acids) were added to 71.5 parts of water. The pH of the soap solution was then adjusted to pH 9.5–10.0 with a very small amount of sodium hydroxide. 0.04 part of ammonium persulfate was then added and the mixture placed in an autoclave having a capacity of 2 gallons. 25.0 parts by weight of butadiene were led in and the polymerization was allowed to take place at 40–47° C. with continuous agitation. At intervals samples were taken out to test the progress of the polymerization. Complete polymerization was obtained at between 18 and 44 hours. The emulsion then contained 25% polymer. To this emulsion was added an inhibitor consisting of a previously prepared emulsion of the monobenzyl ether of hydroquinone. The amount of this emulsion added contained 0.25 part of the monobenzyl ether of hydroquinone (1% of the weight of the butadiene polymer).

*Example 5.*—The emulsion made according to Example 4 was applied to a hand knit wool sample 7" x 5" in size, weighing 21.19 parts. 5.08 parts of the emulsion, an amount containing a weight of polymer corresponding to 6% of the weight of the wool sample, were weighed out and added to 300 parts of water. The bath was conditioned with 1.0 part of anhydrous sodium sulfate. The wool sample was immersed in the cold bath and the bath heated to 60–70° C., in the course of 15 minutes and kept at that temperature. After 30 minutes at 60–70° C., a second portion of 1.0 part anhydrous sodium sulfate was added, and 15 minutes later a third portion of 1.0 part anhydrous sodium sulfate. 10 minutes after the addition of the third portion of sulfate the bath was still hazy and 1.0 part of glacial acetic acid was added. The bath cleared up within 10 minutes after the addition of the acetic acid, thus indicating complete exhaustion. The wool sample had been agitated continuously throughout the whole application. The sample was rinsed with warm water and dried.

The wool sample was then washed for 6 hours in a washing machine containing 35 parts of powdered soap in 18,500 parts of hot water at 70° C. The sample was then rinsed and dried. When examined, it showed only slight felting and shrinkage compared with the very bad shrinkage and felting of an untreated sample of knit wool washed for 6 hours.

*Example 6.*—The emulsion made according to Example 4 was applied to a sample of woolen cloth (flannel) 10" x 10" in size, weighing 12.11 parts. Four lengths of 8" each were marked on the sample, two in the direction of the warp, two in the direction of the fill.

2.91 parts of the emulsion, an amount containing a weight of polymer corresponding to 6% of the weight of the wool sample, were added to 250 parts of water and the bath was conditioned with 1.0 part of anhydrous sodium sulfate. The wool sample was then immersed in the cold bath. The bath was then heated to 60–70° C. and kept at that temperature. After 30 minutes at 60–70° C., 1.5 parts of anhydrous sodium sulfate were added, 10 minutes later another portion of 1.5 parts and 5 minutes later another portion of 1.0 part of anhydrous sodium sulfate were added. 10 minutes later 0.5 part of 50% acetic acid was added. The bath clouded up temporarily, then cleared completely within 1 minute, indicating complete exhaustion. The wool sample had been agitated continuously throughout the application. The sample was rinsed with warm water and dried.

The wool sample was then washed for 6 hours in a washing machine containing 35 parts of powdered soap in 18,500 parts of hot water at 70° C. The sample was then rinsed and dried. An untreated sample was washed with the above sample. The lengths marked on the samples were measured.

*Table I*

|  | Shrinkage | | Felting |
|---|---|---|---|
|  | Warp | Fill |  |
| Treated sample | Percent 2.3 | Percent ¹0.78 | Very slight. |
| Untreated sample | 9.0 | 6.7 | Considerable. |

¹ Increased.

Table I shows that the shrinkage on the treated sample is much smaller than on the untreated sample, and that the treated sample even increased slightly in length in the direction of the fill. There is also a marked difference in the felting.

*Example 7.*—The emulsion made according to Example 4 was applied to a woolen cloth (flannel) 10" x 10" in size weighing 11.99 parts. Four lengths of 8" each were marked on the sample, two in the direction of the warp, two in the direction of the fill.

1.44 parts of the emulsion, an amount containing a weight of polymer corresponding to 3% of the weight of the wool sample, were added to 350 parts of water. The wool sample was immersed in the bath at 26° C. and this temperature was maintained throughout the whole application. 1.58 parts of anhydrous sodium sulfate were dissolved in 10 parts of water. 15 minutes after the immersion of the sample, which was stirred continuously, half the salt solution was added to the bath and 10 minutes later the other half was added. After another 15 minutes 1.0 part of anhydrous sodium sulfate was added, followed 20 minutes later by 0.2 part of 50% acetic acid, and another 10 minutes later by 1.0 part of anhydrous sodium sulfate. 10 minutes later the bath had cleared up except for a slight haze due to the soap in the emulsion and the bath was considered exhausted. The wool sample was taken out, rinsed with warm water and dried.

The wool sample was then washed for 6 hours in a washing machine containing 35 parts of powdered soap in 18,500 parts of hot water at 70° C. The sample was then rinsed and dried, and the marked lengths were measured.

*Table II*

|  | Shrinkage | | Felting |
|---|---|---|---|
|  | Warp | Fill |  |
| Treated sample | Percent 3.5 | Percent 0 | Very slight. |
| Untreated sample | 9.0 | 6.7 | Considerable. |

The data in Table II shows clearly the superiority of the treated sample.

*Example 8.*—The emulsion made according to Example 4 was applied to a wool sock (anklet) weighing 18.31 parts. One length was marked along the foot and one along the leg of the sock.

4.39 parts of the emulsion, an amount containing a weight of polymer corresponding to 6% of the weight of the wool sock, were added to 370 parts of water and the bath was conditioned with 4.0 parts of anhydrous sodium sulfate. The wool sample was immersed in the cold bath and the bath heated to 60–70° C. in the course of 15 minutes. The wool sample was stirred continuously. After 25 minutes at 60–70° C., 2.0 parts of anhydrous sodium sulfate were added to the bath. 15 minutes later 0.075 part of 50% acetic acid was added, followed 10 minutes later by 0.30 part and 5 minutes later by 0.15 part of 50% acetic acid. 10 minutes after this last addition of acid the bath was clear except for a slight haze and was considered exhausted. The wool sample was rinsed with warm water and dried. The lengths marked along the foot and the leg of the sock were measured.

The wool sock was then washed for 6 hours in a washing machine containing 25 parts of powdered soap in 13,000 parts of hot water at 70° C. The wool sample was then rinsed and dried, and the marked lengths were measured again. The extent of the shrinkage and the felting caused by the washing is shown in Table III, where it is also compared with an untreated sample.

*Table III*

|  | Shrinkage | | Felting |
| --- | --- | --- | --- |
|  | Foot | Leg |  |
|  | Per cent | Per cent |  |
| Treated sample | 3.2 | 1.8 | Very slight. |
| Untreated sample | 18.3 | 15.7 | Considerable. |

The data in Table III show clearly that the treated sample is very much superior to the untreated control sample.

*Example 9.*—A butadiene-butyl methacrylate co-polymer emulsion was prepared as follows. 40 parts of butadiene were condensed in a pressure reactor cooled to below −5° C. 10 parts of butyl methacrylate, which had been distilled previously, 100 parts of distilled water, 5 parts of 10% aqueous ammonium persulfate solution, 5 parts of soap (Ivory Flakes) and 2 parts of sodium carbonate ($Na_2CO_3.H_2O$) were added to the butadiene in the pressure reactor. The reactor was then sealed, allowed to come to room temperature, and placed in a shaker with a constant temperature bath at 45° C., where it was kept for 40 hours. The reactor was allowed to cool to room temperature and since no pressure could be observed when the reactor was opened, complete polymerization was indicated, and the solid content of the emulsion was therefore 33⅓%.

*Example 10.*—The emulsion prepared according to Example 9 was applied to woolen cloth (flannel). The sample was 10″ x 10″ in size and weighed 12.03 parts. Four lengths of 8″ each were marked on the sample, two in the direction of the warp, two in the direction of the fill.

2.17 parts of the emulsion, an amount containing a weight of polymer corresponding to 6% of the weight of the wool sample, were added to 250 parts of water and the bath was conditioned with 1.0 part of anhydrous sodium sulfate. The wool sample was immersed in the cold bath, and the bath was then heated to 60–70° C. in the course of 15 minutes, while the wool sample was stirred continuously. More anhydrous sodium sulfate was added in the following amounts: after 15 minutes at 60–70° C., 1.0 part sodium sulfate, 10 minutes later 1.0 part, 15 minutes later 1.0 part, 10 minutes later 1.0 part, 5 minutes later 2.0 parts, 10 minutes later 2.0 parts, 15 minutes later 2.0 parts, followed by three more portions of 1.0 part sodium sulfate each spaced at 10 minute intervals. 15 minutes after the last addition of anhydrous sodium sulfate the bath was clear except for a slight haze and the bath was considered exhausted. Including the initial amount, 14.0 parts of anhydrous sodium sulfate were added during the course of the application. The sample was taken out, rinsed with warm water and dried. The lengths marked on the sample were measured.

The wool sample was then washed for 6 hours in a washing machine containing 35 parts of powdered soap in 18,500 parts of hot water at 70° C. The wool sample was then rinsed and dried, and the marked lengths measured again.

*Table IV*

|  | Shrinkage | | Felting |
| --- | --- | --- | --- |
|  | Warp | Fill |  |
|  | Per cent | Per cent |  |
| Treated sample | 5.5 | 4.7 | Slight. |
| Untreated sample | 9.0 | 6.7 | Considerable. |

Table IV shows the shrinkage and the felting caused by the washing and indicates how favorably the treated sample compares with an untreated control sample.

*Example 11.*—A butadiene-styrene co-polymer emulsion was prepared as follows. 45 parts of butadiene, which had been passed over calcium chloride, were condensed in a pressure reactor cooled to below −5° C., 5 parts of styrene, which had been distilled previously, 100 parts of distilled water, 5 parts of a 10% aqueous solution of ammonium persulfate and 5 parts of soap (Ivory Flakes) were then added to the butadiene in the pressure reactor. The reactor was sealed, allowed to come to room temperature and placed in a shaker with a constant temperature water bath at 45° C. The reactor was shaken for 40 hours. After that period the polymerization was quite complete since only a trace of pressure was observed on opening the reactor at room temperature. The solid contents of this emulsion was therefore 33⅓%.

*Example 12.*—The emulsion prepared according to Example 11 was applied to woolen flannel. The sample was 10″ x 10″ in size and weighed 12.73 parts. Four lengths of 8″ each were marked on the sample, two in the direction of the warp, two in the direction of the fill.

1.72 parts of the emulsion, an amount containing a weight of polymer corresponding to 4.5% of the weight of the wool sample, were added to 260 parts of water. The wool sample was wetted in water, then immersed in the cold bath. The bath was then heated to 60° C. in the course of 15 minutes. In the meantime 3.38 parts of anhydrous sulfate were dissolved in 50 parts of water. When the bath temperature reached 60° C. one half of the salt solution was added, followed by the other half 15 minutes later. 45 minutes after this second addition of salt a moderate haze was still noticeable in the bath, but since it could not be removed by further addition of salt, this point was taken as the point of complete exhaustion. The sample was taken out, rinsed with warm water and dried. The lengths marked on the wool sample were measured.

The wool sample was then washed for 6 hours in a washing machine containing 35 parts of powdered soap in 18,500 parts of hot water at 70° C. The wool sample was then rinsed and dried, and the marked lengths measured again.

*Table V*

|  | Shrinkage | | Felting |
|---|---|---|---|
|  | Warp | Fill |  |
|  | Percent | Percent |  |
| Treated sample | 18.2 | 3.6 | Moderate. |
| Untreated sample | 29.5 | 12.6 | Bad. |

Table V shows the extent of the shrinkage and the felting caused by the washing. The treated sample stood up much better than an untreated sample washed for the same number of hours.

*Example 13.*—A butadiene α-p-dimethyl styrene co-polymer emulsion was prepared as follows: 22.5 parts of butadiene, which had previously been passed over calcium chloride and had been condensed, and 2.5 parts of α, p-dimethyl styrene, which had been distilled previously, were placed in a pressure reactor cooled to below —5° C. 50 parts of distilled water, 2.5 parts of a 10% aqueous solution of ammonium persulfate, and 5 parts of soap (Ivory Flakes) were added. The reactor was sealed and allowed to come to room temperature. The vessel was then placed in a shaker with a constant temperature water bath at 45° C. and left there for 40 hours. At the end of this period the polymerization was quite complete since only a trace of pressure was observed when the reactor was opened at room temperature. The solid content of the emulsion was therefore 33⅓%.

*Example 14.*—The emulsion made up according to Example 13 was applied to wool flannel. The sample was 10″ x 10″ and weighed 12.66 parts. Four lengths of 8″ each were marked on the sample, two in the direction of the warp, two in the direction of the fill.

1.71 parts of the emulsion, an amount containing a weight of polymer corresponding to 4.5% of the weight of the wool sample, were added to 260 parts of water. The wool sample was wetted out in water, then immersed in the cold bath. The bath was then heated to 60° C. in the course of 15 minutes. In the meantime 3.36 parts of anhydrous sodium sulfate were dissolved in 50 parts of water. When the bath temperature reached 60° C. one-half of the sodium sulfate solution was added, followed by the other half 15 minutes later. 45 minutes after this second salt addition the bath was clear except for a slight haze and was considered exhausted. The wool sample was taken out, rinsed and dried. The lengths marked on the sample were measured.

The wool sample was then washed for 6 hours in a washing machine containing 35 parts of powdered soap in 18,500 parts of hot water at 70° C. The wool sample was then rinsed and dried, and the marked lengths measured again.

*Table VI*

|  | Shrinkage | | Felting |
|---|---|---|---|
|  | Warp | Fill |  |
|  | Percent | Percent |  |
| Treated sample | 19.6 | 3.1 | Moderate. |
| Untreated sample | 29.5 | 12.6 | Bad. |

The percentage shrinkage and the extent of felting caused by the washing for the treated and untreated sample are shown in Table VI. The treated sample had a definite resistance to shrinking and felting.

*Example 15.*—A butadiene-α, p-dimethyl styrene co-polymer emulsion was prepared as follows. 20.0 parts of butadiene, which had previously been passed over calcium chloride and had been condensed, and 5.0 parts of α, p-dimethyl styrene, which had been distilled previously, were placed in a pressure reactor cooled to below —50° C. 50 parts of distilled water, 2.5 parts of a 10% aqueous solution of ammonium persulfate, and 5 parts of soap (Ivory Flakes) were added. The reactor was sealed and allowed to come to room temperature. The vessel was then placed in a shaker with a constant temperature water bath at 45° C. and left there for 40 hours. At the end of this period the polymerization was quite complete since only a trace of pressure was observed when the reactor was opened at room temperature. The solid content of the emulsion was therefore 33⅓%.

*Example 16.*—The emulsion made up according to Example 15 was applied to a wool flannel sample, 10″ x 10″ in size, weighing 13.00 parts. Four lengths of 8″ each were marked on the sample, two in the direction of the warp, two in the direction of the fill.

1.75 parts of the emulsion, an amount containing a weight of polymer corresponding to 4.5% of the weight of the wool sample, were added to 260 parts of water. The wool sample was wetted out in water, then immersed in the cold bath. The bath was then heated to 60° C. in the course of 15 minutes. In the meantime, 3.44 parts of anhydrous sodium sulfate were dissolved in 50 parts of water. When the bath temperature reached 60° C. one-half of the sodium sulfate solution was added, followed by the other half 15 minutes later. The bath was kept at 60° C. all the time and the wool sample agitated continuously. 35 minutes after the second addition of sulfate the bath was clear except for a slight haze and the bath was considered exhausted. The wool sample was taken out, rinsed and dried. The lengths marked on the sample were measured.

The wool sample was then washed for 6 hours in a washing machine containing 35 parts of powdered soap in 18,500 parts of hot water at 70° C. The wool sample was then rinsed and dried, and the marked lengths measured again.

*Table VII*

|  | Shrinkage | | Felting |
|---|---|---|---|
|  | Warp | Fill |  |
|  | Percent | Percent |  |
| Treated sample | 16.9 | 3.3 | Moderate. |
| Untreated sample | 29.5 | 12.6 | Bad. |

The data in Table VII indicate that the treated sample shows a definite improvement over an untreated sample washed for the same number of hours.

*Example 17.*—The emulsion made up according to Example 4 was applied to samples of woolen flannel, 10" x 10" in size, weighing approximately 13 parts. Seven samples were treated using a different amount of sodium sulfate for each one. Four lengths of 8" each were marked on each sample, two lengths in the direction of the warp, two lengths in the direction of the fill.

An amount of emulsion containing a weight of polymer corresponding to 4.5% of the weight of the wool sample was added to a volume of water 50 parts less than 20 times the weight of the wool. The anhydrous sulfate used was dissolved in 50 parts of water and added to the bath. The amounts of salt converted to percent Glauber's salt based on the weight of the wool were 8%, 15%, 30%, 45%, 60%, 75% and 90%. The wool sample was wetted in water at 30° C. for 10 minutes and then immersed in the bath containing the emulsion and the salt. The vessel containing the bath and the wool sample was stoppered and put into an agitator with a constant temperature bath at 25° C. The sample was agitated until exhaustion occurred and the exhaustion time was noted. The sample was rinsed with warm water and dried. The marked lengths on the sample were measured.

The seven samples treated in the way described above and one untreated sample with four lengths of 8" each marked on it were then washed for 6 hours in a washing machine containing 35 parts of powdered soap for 18,500 parts of hot water at 70° C.

The wool samples were then rinsed with warm water and dried. The marked lengths were measured again and the shrinkage caused by the washing was computed. The results compared favorably with those described in other examples where good shrink-proofing was obtained.

This procedure, using the same seven percentages of salt, was repeated for applications with an agitator bath temperature of 45° C., 65° C., and 78° C. instead of 25° C. Table VIII lists the exhaustion times for each of these applications.

*Table VIII*

| Per Cent Glauber's Salt | Exhaustion Time (in minutes) at— | | | |
|---|---|---|---|---|
| | 25° C. | 45° C. | 65° C. | 78° C. |
| 8 | 90 | 80 | 81 | 65 |
| 15 | 85 | 80 | 75 | 65 |
| 30 | 85 | 80 | 75 | 65 |
| 45 | 65 | 60 | 53 | 55 |
| 60 | 50 | 40 | 36 | 35 |
| 75 | 50 | 40 | 36 | 27 |
| 90 | 45 | 40 | 36 | 19 |

Figure 1:
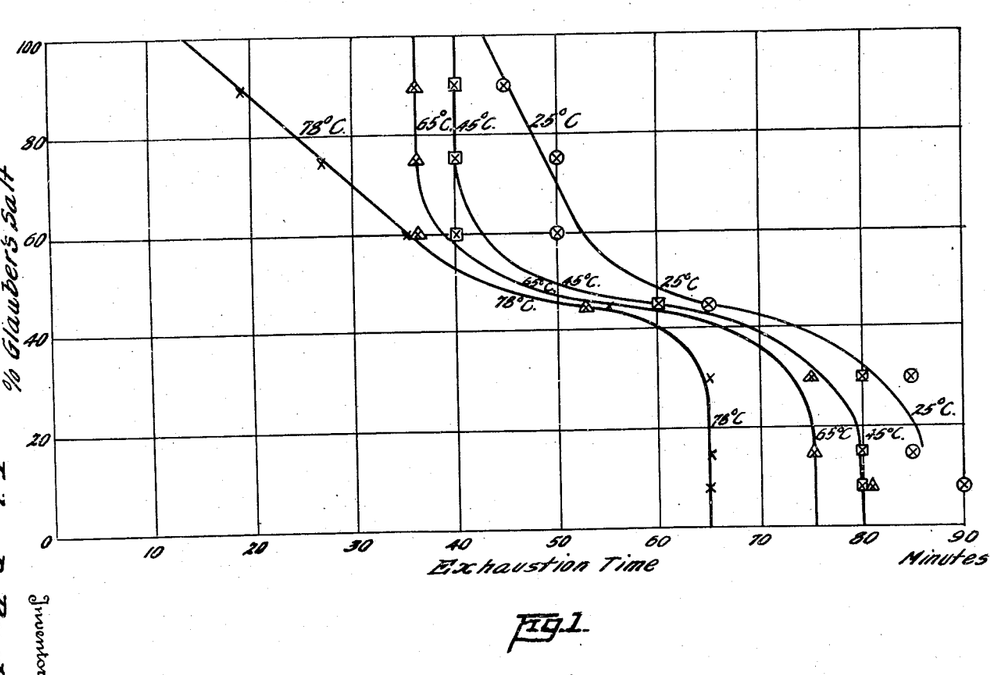

For each of the application temperatures a curve was drawn plotting the percentages of Glauber's salt against the exhaustion time required under those conditions. The four graphs are shown in Figure 1. They indicate that in the range between 30 and 60% Glauber's salt a small change in the percentage of salt has a strong influence on the exhaustion time, while below and above this range the exhaustion time is not very much affected by changes in the amount of salt. These curves are, of course, limited to the woolen material used and to the conditions under which the emulsion was applied. The use of a different type of cloth or a change in the application procedure may result in a different type of curves.

*Example 18.*—The emulsion made according to Example 4 was applied to four samples of a woolen flannel, 10" x 10" in size, weighing approximately 13 parts each. Four lengths of 8" each were marked on each sample, two lengths in the direction of the warp, two lengths in the direction of the fill.

Sample A, weighing 13.04 parts, was wetted in water at 30° C. for 10 minutes, and after removal of most of the water was immersed in a bath at 27° C. containing 1.30 parts of 50% acetic acid in 390 parts of water. After 10 minutes 2.35 parts of emulsion, containing a weight of polymer corresponding to 4.5% of the weight of the wool, were added and the sample agitated continuously. 1.72 parts of anhydrous sodium sulfate (13.2% of the weight of the wool) were dissolved in 50 parts of water. Three minutes after the addition of the emulsion half of this salt solution was added to the bath at 27° C. The other half of the salt solution was added 10 minutes later. The bath was exhausted slowly and after 80 minutes, counted from the time of the addition of the emulsion, no further exhaustion seemed possible. The bath was still cloudy. The sample was taken out, rinsed and dried. The marked lengths were measured.

Sample B, which weighed 13.09 parts, was pretreated with a bath containing 13.1 parts of glacial acetic acid in 260 parts of water. The wool sample was immersed in the boiling bath and kept in there for 10 minutes. The sample was then rinsed with warm water and immersed in a bath at 27° C. containing 2.36 parts of emulsion (4.5% polymer based on the weight of the wool) and 1.3 parts of 50% acetic acid in 390 parts of water. The wool sample was agitated continuously. A solution of 1.73 parts of anhydrous sodium sulfate was prepared and half of this solution was added to the bath 3 minutes after the immersion of the wool sample. Ten minutes later the second half of the salt solution was added to the bath at 27° C. After 63 minutes from the time of the immersion of the wool sample, the bath had cleared to a slight haze and was considered exhausted. The wool sample was rinsed and dried. The marked lengths were measured.

Sample C, weighing 12.85 parts, was pretreated with 12.9 parts of glacial acetic acid in 260 parts of water. The wool sample was immersed in the boiling bath and kept in there for 10 minutes. After being rinsed with warm water the sample was immersed in a bath at 27° C. containing 2.31 parts of the emulsion and 1.3 parts of 50% acetic acid in 390 parts of water. The amount of emulsion used corresponded to 4.5% of the weight of the wool. The bath was kept at 27° C. and the sample was agitated continuously. After 30 minutes the bath had exhausted to a slight haze. 0.5 part of 50% acetic acid dissolved in 25 parts of water was added. Within 10 minutes the bath cleared to a very slight haze and was considered exhausted. The wool sample was rinsed and dried. The marked lengths were measured.

Sample D, weighing 12.85 parts, was pretreated with 12.9 parts of glacial acetic acid in 260 parts of water. The wool sample was immersed in the acid bath at 70° C. and kept in there for 30 minutes. After being rinsed with warm water the sample was immersed in a bath at 27° C. containing 2.31 parts of emulsion (4.5% polymer based on the weight of the wool) and 1.3 parts of 50% acetic acid in 390 parts of water.

The sample was agitated continuously. After 45 minutes 0.5 part of 50% acetic acid in 25 parts of water was added, followed 25 minutes later by 0.8 part of 50% acetic acid in 25 parts of water. A slow gradual change took place throughout the application and after 90 minutes, counted from the time of the immersion of the sample, the bath had cleared to a slight haze and was considered exhausted. The wool sample was rinsed and dried. The marked lengths were measured.

The four samples A, B, C, and D, and an untreated sample on which had been marked four lengths of 8" each, were washed for six hours in a washing machine using 35 parts of powdered soap for 18,500 parts of water at 70° C. The wool samples were then rinsed with warm water and dried. The marked lengths were measured and the shrinkage due to the washing was computed.

of water. When the temperature of the bath reached 60° C. half of this salt solution was added to the bath, and the bath kept at 60° C. Fifteen minutes later the second half of the salt solution was added. After 90 minutes, counted from the time of immersion of the sample, the bath had exhausted to a moderate haze and, since no further change seemed to take place, the wool sample was taken out, rinsed with warm water and dried.

Sample B, (weight 13.07 parts,) was pretreated with a bath containing 13.1 parts of glacial acetic acid (100% of the weight of the wool) in 260 parts of water. The sample was immersed in the bath at 100° C. and kept in there for 10 minutes. The sample was rinsed, then immersed in a bath at room temperature containing 2.35 parts of the emulsion (4.5% polymer based on the weight of the wool) in 260 parts of water. The bath was

Table IX

| Sample | Pretreatment | | | Application of Emulsion | | | | | Percent Shrinkage | | Felting |
|---|---|---|---|---|---|---|---|---|---|---|---|
| | Percent Glacial acetic acid | Temp., °C. | Time, min. | Temp., °C. | Parts 50 percent acetic acid | Anhydrous Na$_2$SO$_4$ percent | Exhaustion time min. | Remaining haze | Warp | Fill | |
| A | | | | 27 | 1.3 | 13.2 | 80 | cloudy | 4.8 | 2.0 | very slight. |
| B | 100 | 100 | 10 | 27 | 1.3 | 13.2 | 63 | slight | 3.9 | 1.6 | Do. |
| C | 100 | 100 | 10 | 27 | 1.8 | | 40 | very slight | 4.4 | 2.2 | Do. |
| D | 100 | 70 | 30 | 27 | 2.6 | | 90 | slight+ | 4.6 | 3.0 | Do. |
| Control sample | | | | | | | | | 32.3 | 12.4 | Bad. |

The extent of the shrinkage and the felting is listed in Table IX together with a tabulation of the conditions of the pretreatment and the application of the emulsion. The data show that excellent shrink-proofing and felt-proofing were obtained on all treated samples, but that the way in which the emulsion was applied did not influence the shrink-proofing or felt-proofing qualities to any appreciable extent. It will, however, be noted that the exhaustion time is considerably reduced by a pretreatment with 100% glacial acetic acid based on the weight of the wool and that the exhaustion is more complete, even though the time is shorter. The higher the temperature of the pretreatment bath the shorter is the exhaustion time. Pretreatments with less than 100% glacial acetic acid have been tried but they did not affect the exhaustion time appreciably, if the emulsion was applied at 27° C. The shortest exhaustion time was obtained, when the emulsion was applied to the pretreated sample using acid only, but no salt, in the application.

*Example 19.*—The emulsion made according to Example 4 was applied to eight samples of woolen flannel, 10" x 10" in size, weighing approximately 13 parts each. Four lengths of 8" each were marked on each sample, two lengths in the direction of the warp, two lengths in the direction of the fill.

Sample A, weighing 13.20 parts, did not get any acid pretreatment. The wool sample was wetted in water at 30° C. for 10 minutes, and after removal of most of the water, was immersed in a bath at room temperature containing 2.38 parts of the emulsion (4.5% polymer based on the weight of the wool) and 260 parts of water. The bath was heated to 60° C. in the course of 15 minutes, and the sample was agitated continuously. In the meantime 3.50 parts of anhydrous sodium sulfate (26.5% of the weight of the wool) were dissolved in 50 parts of water. When the bath temperature reached 60° C. half of this salt solution was added to the bath, followed 15 minutes later by the other half of the salt solution. The bath was kept at 60° C., until 5 minutes later the bath was exhausted except for a trace of a haze. The total exhaustion time, counted from the immersion of the sample, was therefore 35 minutes. The sample was rinsed with warm water and dried.

Sample C, (weight 13.01 parts,) was given the same pretreatment as sample B. The application of the emulsion was also the same as in the treatment of sample B, except that the second salt addition was left out. Thus only 13.25% of anhydrous sodium sulfate, based on the weight of the wool, were added. This salt was added when the bath temperature reached 60° C. Forty minutes after the immersion of the wool sample the bath had cleared to a moderate haze and was considered exhausted, since no further change occurred. The sample was rinsed with warm water and dried.

Sample D, (weight 12.91 parts,) received the same pretreatment as samples B and C. The wool sample was then rinsed and immersed into a bath at room temperature containing 2.32 parts of the emulsion (4.5% polymer based on the weight of the wool) and 260 parts of water. The bath was heated to 60° C. in the course of 15 minutes, as before, but this time no salt was added at all. The bath was kept at 60° C. and the sample agitated continuously. In 45 minutes, counted from the immersion of the sample, the bath exhausted to a moderate haze. No further change took place. The sample was rinsed with warm water and dried.

Sample E, weighting 12.54 parts, received the same pretreatment as samples B, C, and D (12.5 parts glacial acetic acid in 250 parts of water at 100° C. for 10 minutes.) After being rinsed the wool sample was immersed in a bath containing 2.20 parts of the emulsion and 0.5 part of 50% acetic acid in 250 parts of water. The bath temperature was raised to 60° C. in the course of 15 minutes and then kept at that temperature, while the sample was agitated continuously. No salt was added to the bath. Thirty-seven minutes after the immersion of the sample the bath was completely clear. The sample was rinsed with warm water and dried.

Sample F, (weight 12.84 parts,) received a pretreatment in a bath containing 12.8 parts of glacial acetic acid (100% of the weight of the wool) in 260 parts of water. This time, however, the acid pretreatment was applied at 70° C. and the sample was left in the bath for 30 minutes. The sample was then rinsed, and the emulsion was applied in the same way as described for sample E, using again 0.5 part of 50% acetic acid, but no salt. Forty-five minutes after the immersion of the wool sample in the bath containing the emulsion the bath had cleared completely, leaving no haze at all.

Sample G, (weight 12.83 parts,) was pretreated in a bath containing only 1.3 parts of glacial acetic acid (10% of the weight of the wool in 260 parts of water. The wool was immersed in the bath at 100° C. and kept in it for 10 minutes. The sample was then rinsed and immersed in a bath containing 2.31 parts of emulsion (4.5% polymer based on the weight of the wool) and 0.5 part of 50% acetic acid in 260 parts of water and the emulsion was applied in the same manner as described for samples E and F. The bath was completely clear 47 minutes after the immersion of the sample in the bath containing the emulsion. The sample was rinsed with warm water and dried.

Sample H, (weight 12.59 parts,) was pretreated with 1.3 parts of glacial acetic acid in 260 parts of water, but this time at 70° C. for 30 minutes. The sample was then rinsed and 2.27 parts of emulsion (4.5% polymer based on the weight of the wool), were applied from a bath containing the emulsion and 0.5 part of 50% acetic acid in 250 parts of water in exactly the same way as described for samples E, F, and G. The bath was completely clear 60 minutes after the sample had been immersed in the bath containing the emulsion. The sample was rinsed and dried.

The four lengths which had been marked on samples A to H were measured and four lengths of 8" each were marked on an untreated sample. The eight treated samples and the untreated control sample were then washed for 6 hours in a washing machine containing 35 parts of powdered soap in 18,500 parts of water at 70°C. The wool samples were then rinsed with warm water and dried. The marked lengths were measured and the shrinkage due to the washing was computed.

The extent of the shrinkage and the felting is listed in Table X, accompanied by a tabulation of the conditions of pretreatment and the application of the emulsion. As in Example 18, excellent shrink-proofing and felt-proofing was obtained on all treated samples, regardless of the manner in which the emulsion was applied. Again pretreatments with acetic acid shortened the exhaustion time considerably and made the exhaustion more complete. In the case of applications of the emulsion at 60° C., however, even a pretreatment with 10% glacial acetic acid, based on the weight of the wool, showed a highly beneficial effect, while this concentration did not show any appreciable effect in the application at 27° C., described in Example 18. Again the effect became larger with increasing acid concentration and increasing temperature in the pretreatment, and the shortest exhaustion time was again obtained when the application of the emulsion, after the pretreatment, was carried out with acid only, without salt. In conclusion it might be mentioned that it was generally found that when a large number of samples was treated with or without pretreatment, the samples which had been pretreated showed only very small variations among themselves with respect to the shrinking and felting, while a much larger variation was found among samples which had not been pretreated with acid. This was true for the application at 27° C. as well as for the application at 60° C.

*Example 20.*—A butadiene polymer emulsion was prepared as described in Example 4, except that 7.0 parts of soap (sodium salt of coconut oil acids) were added to 68.0 parts of water, instead of the 3.5 parts of soap added to 71.5 parts of water in Example 4. Also the amount of inhibitor emulsion added to the finished butadiene polymer emulsion was raised so as to contain 1.5 parts of the monobenzyl ether of hydroquinone (1.5% based on the weight of the butadiene polymer emulsion).

*Example 21.*—A butadiene polymer emulsion was prepared as described in Example 4, except that no inhibitor at all was added to the emulsion. The polymer content of this emulsion was 33⅓%.

*Example 22.*—The emulsions prepared according to Examples 20 and 21 were applied to eight woolen flannel samples, 10" x 10" in size, weighing approximately 13.00 parts. The samples were designated by the letters A to H. Four lengths

Table X

| Sample | Pretreatment | | | Application of Emulsion | | | | | Percent Shrinkage | | Felting |
| --- | --- | --- | --- | --- | --- | --- | --- | --- | --- | --- | --- |
| | Percent Glacial acetic acid | Temp., °C. | Time, min. | Temp., °C. | Parts 50 percent acetic acid | Anhydrous Na$_2$SO$_4$ percent | Exhaustion time, min. | Remaining haze | Warp | Fill | |
| A | | | | 60 | | 26.5 | 90 | moderate | 4.6 | 2.5 | very slight. |
| B | 100 | 100 | 10 | 60 | | 26.5 | 35 | trace | 4.4 | 1.1 | Do. |
| C | 100 | 100 | 10 | 60 | | 13.25 | 40 | moderate | 7.4 | 0.6 | slight. |
| D | 100 | 100 | 10 | 60 | | | 45 | do | 3.0 | 1.1 | very slight. |
| E | 100 | 100 | 10 | 60 | 0.5 | | 37 | none | 4.6 | 1.4 | slight. |
| F | 100 | 70 | 30 | 60 | 0.5 | | 45 | do | 6.1 | 1.7 | Do. |
| G | 10 | 100 | 10 | 60 | 0.5 | | 47 | do | 3.3 | 2.7 | Do. |
| H | 10 | 70 | 30 | 60 | 0.5 | | 60 | do | 4.9 | 2.5 | Do. |
| Control sample | | | | | | | | | 36.1 | 13.0 | very bad. | of 8" each were marked on each sample, two in the direction of the warp and two in the direction of the fill.

Samples A and B were given 3% and 6% treatments with the emulsion from Example 20, while C and D received treatments with 3% and 6%, respectively, of the emulsion without inhibitor made according to Example 21. Samples E to H received the same treatments as A to D except that an acid pretreatment was used followed by a modified procedure for the application of the emulsion. The purpose of this series was to show the effect of the inhibitor on the shrink-proofing properties of the emulsion.

Sample A weighing 12.89 parts, was immersed in a bath at room temperature containing 1.55 parts of the emulsion from Example 20 (3% polymer based on the weight of the wool,) in 260 parts of water. The bath was heated to 60° C. in the course of 15 minutes. 3.42 parts of anhydrous sodium sulfate were dissolved in 50 parts of water. When the bath temperature reached 60° C., half of this salt solution was added to the bath, followed fifteen minutes later by the second half. All the time the bath was kept at 60° C. and the wool sample was agitated continuously. Seventy minutes after the second salt addition the bath was still cloudy and 0.1 part of 50% acetic acid was added, followed 20 minutes later by 0.3 part of 50% acetic acid. Ten minutes later the bath was exhausted except for a trace of a haze. The exhaustion time, counted from the immersion of the sample, was 130 minutes and 0.4 part of 50% acetic acid had been added altogether.

Sample B, weighing 12.94 parts, was immersed in a bath at room temperature containing 3.11 parts of the emulsion from Example 20, (6% polymer based on the weight of the wool,) in 260 parts of water. The bath temperature was raised to 60° C. in 15 minutes. Half of a salt solution made by dissolving 3.43 parts of anhydrous sodium sulfate in 50 parts of water was then added, followed 15 minutes later by the other half. Seventy minutes after this second salt addition the bath was still cloudy and 0.1 part of 50% acetic acid was added. These were followed 2 minutes later by another portion of 0.1 part of 50% acetic acid and another 8 minutes later by 0.5 part of 50% acetic acid. Thus, 0.7 part of 50% acetic acid had been added altogether. Ten minutes after the last addition of acid the bath was clear except for a trace of a haze. The exhaustion time was 120 minutes.

Sample C, (weight 12.91 parts,) was immersed in a bath at room temperature containing 1.16 parts of the emulsion without inhibitor, made according to Example 21, in 260 parts of water. This amount of emulsion corresponded to 3% polymer based on the weight of the wool. The bath temperature was taken up to 60° C. in the course of 15 minutes. 3.42 parts of anhydrous sodium sulfate were dissolved in 50 parts of water and half of this solution was added when the bath temperature reached 60° C. Fifteen minutes later the second half of this solution was added to the bath. Thirty-five minutes later 2 parts of sodium sulfate dissolved in 20 parts of water were added, followed 15 minutes later by the same amount. The bath began to clear up and 20 minutes after the last salt addition 0.1 part of 50% acetic acid was added. Ten minutes later the bath was completely clear. Altogether 7.42 parts of sodium sulfate had been added. The total exhaustion time, counted from the immersion of the sample, was 110 minutes.

Sample D, (weight 12.89 parts,) was immersed in a bath containing 2.32 parts of emulsion from Example 21, (6% polymer based on the weight of the wool,) in 260 parts of water. The procedure was then the same as that described for sample C, except that 0.3 part of 50% acetic acid was added toward the end of the application, instead of the 0.1 part used for sample C. A very sudden clearing took place after the addition of the acid and the bath was completely clear 3 minutes after this addition. The total salt added was therefore 7.42 parts of sodium sulfate and the total amount of 50% acetic acid added was 0.3 part. The exhaustion time was 103 minutes. The sample, when taken out of the bath, had a somewhat sticky feel, which was probably due to the sudden exhaustion of the bath on addition of the acid. The sticky feel disappeared later in the washing of the sample.

Samples E to H were all treated in the same way, except for the type and the amount of the emulsion. Table XI lists the proportions used for these samples. In all four cases the samples received a pretreatment with 25% of glacial acetic acid, based on the weight of the wool, in a volume of water 20 times the weight of the wool. The samples were immersed in this bath at 100° C. and kept it in for 10 minutes. Then they were rinsed and immersed in a bath at room temperature containing the acid and the emulsion in water. The bath was heated to 60° C. in fifteen minutes and then kept at that temperature until the bath was exhausted completely.

All eight samples were rinsed with warm water after the application of the emulsion, and then dried. The marked lengths on the samples were measured.

*Table XI*

| Sample | Pretreatment | | Application of Emulsion | | | | | | | Exhaustion time in min. |
| | Parts glacial acetic acid | Parts water | Weight wool sample | Emulsion example | Per cent inhibitor | Per cent polymer based on weight wool | Parts emulsion | Parts water | Parts 50 acetic acid | |
|---|---|---|---|---|---|---|---|---|---|---|
| E | 3.3 | 260 | 13.20 | 20 | 1.5 | 3 | 1.58 | 260 | 0.5 | 26 |
| F | 3.2 | 260 | 12.66 | 20 | 1.5 | 6 | 3.09 | 260 | 0.5 | 53 |
| G | 3.2 | 250 | 12.66 | 21 | None | 3 | 1.14 | 250 | 0.5 | 20 |
| H | 3.2 | 260 | 12.91 | 21 | None | 6 | 2.32 | 260 | 0.5 | 35 |

These eight samples and one untreated control sample, also with four lengths of 8" each marked on it, were then washed for six hours in a washing machine using 35 parts of powdered soap for 18,500 parts of hot water at 70° C. The samples were then rinsed and dried, and the marked lengths were measured again. The shrinkage caused by the washing was computed. The results are shown in Table XII.

Table XII

| Sample | Pretreatment | Per cent polymer | Per cent inhibitor in emulsion | Per cent shrinkage Warp | Per cent shrinkage Fill | Felting |
|---|---|---|---|---|---|---|
| A | No | 3 | 1.5 | 4.3 | 0 | Slight. |
| B | No | 6 | 1.5 | 2.7 | 0.3 | Do. |
| C | No | 3 | None | 21.0 | 1.9 | Bad. |
| D | No | 6 | None | 5.1 | 1.6 | Moderate. |
| E | Yes | 3 | 1.5 | 3.6 | 1.4 | Slight. |
| F | Yes | 6 | 1.5 | 1.6 | 1.4 | Do. |
| G | Yes | 3 | None | 16.9 | 2.5 | Bad. |
| H | Yes | 6 | None | 7.5 | 1.4 | Considerable. |
| Control | No | None | | 34.3 | 12.2 | Very bad. |

These results show clearly that the inhibitor, or antioxidant, improves the shrink-proofing effect of the emulsion considerably. The effect seems to be even more pronounced when small percentages of polymer are applied to the wool, but also higher percentages, such as 6%, show a marked increase in the shrink-proofing and felt-proofing properties, if an antioxidant is added.

*Example 23.*—The emulsion made according to Example 20 and the same emulsion with additional antioxidant added to the emulsion or the bath was applied to 75% wool socks. These socks were then subjected to a test for resistance to high temperatures.

A. A pair of socks, weighing 115.26 parts, was immersed in a bath at 65° C. containing 18.4 parts of 50% acetic acid in 2300 parts of water. The socks were agitated in the bath for five minutes. Then 20.8 parts of the emulsion from Example 20 (4.5% polymer based on the weight of the socks) were added to the bath. This emulsion contained the usual 1½% antioxidant, and no additional antioxidant was added in this case. The socks were agitated in the bath, which was kept at 65° C. all the time. Ten minutes after the addition of the emulsion 7.2 parts of anhydrous sulfate dissolved in 50 parts of water were added (6.25% sulfate based on the weight of the socks), followed 2 minutes later by the same amount. Portions of 14.4 parts of anhydrous sodium sulfate (12.5% sulfate based on the weight of the socks) dissolved in 100 parts of water were added 20 minutes, 36 minutes, and 60 minutes after the addition of the emulsion. Fifteen minutes later the bath had cleared to a moderate haze and was considered exhausted. The total exhaustion time, counted from the addition of the emulsion, was 75 minutes and the total sodium sulfate added amounted to 57.6 parts or 50% based on the weight of the socks.

B. The emulsion from Example 20 was applied to a pair of socks, weighing 113.25 parts, in the same way as described for sample A, except that enough of the antioxidant emulsion, which had been used in making the butadiene polymer emulsion, was added to raise the total antioxidant content to 5% of the polymer emulsion, i.e., 3.5% antioxidant were added. As described in Examples 4 and 20 this antioxidant was the monobenzyl ether of hydroquinone. The butadiene polymer emulsion with the additional antioxidant was then added to the bath and applied in the same way as described for sample A.

C. A pair of socks, (weight 123.75 parts,) were treated with the emulsion from Example 20 in the same way as sample A, except that 0.781 part of phenyl β-naphthylamine, known to the trade as "Neozone D," dissolved in 30 parts of isopropanol and 2 parts of 20% sodium hydroxide, were added to the acid bath with the socks, just before the emulsion was added. This represented an additional 3.5% of antioxidant based on the weight of the emulsion, so that the total antioxidant content of the emulsion was raised to 5%.

D. A fourth pair of socks, (weight 114.84 parts,) was treated with the emulsion from Example 20 in the same way as sample A, except that 0.723 part of p-hydroxyphenyl glycine, known to the trade as "Glycin," was added. The antioxidant, corresponding to 3.5%, based on the weight of the emulsion, was dissolved in 30 parts of water and 1 part of 20% sodium hydroxide, and added to the bath, just before the emulsion was added. Thus the total antioxidant content was again 5%. After the application of the emulsion the socks were rinsed with warm water and dried.

The four pairs of socks were put on wooden forms which were then placed into an oven standing up in a vertical position. The temperature in the oven was 140° C. and the socks were subjected to this temperature for 30 minutes. They were then taken out, pulled off the wooden forms and examined. The results are shown in Table XIII.

Table XIII

| Sample | Antioxidant added to the original 1.5% monobenzyl ether of hydroquinone | Condition after heat treatment |
|---|---|---|
| A | None | Yellowing in certain spots; odor of burnt wool. |
| B | 3.5% monobenzyl ether of hydroquinone | No yellowing; slight odor of burnt wool. |
| C | 3.5% phenyl β-naphthylamine | No yellowing; no odor. |
| D | 3.5% p-hydroxyphenyl glycine | Do. |

The results indicate that an increase in the antioxidant content improves the resistance of the socks to high temperatures. If the same amounts of antioxidant are used the phenyl β-naphthylamine and the p-hydroxyphenyl glycine give more protection than the same amount of the monobenzyl ether of hydroquinone. The increased heat resistance means that the socks can be dried at higher temperatures, which in many cases is of great advantage.

Having thus set forth my invention, I claim:

1. A bath for treating wool to give shrink-proofing with substantially normal hand which comprises an aqueous substantially stable emulsion of a synthetic butadiene polymer of 100% polymerization, in amount to give 1 to 25% by weight of polymer deposition on the wool, and a soap alone as the essential emulsifying agent, the soap being an alkali metal salt of a fatty acid containing at least 10 carbon atoms, and at least 25% by weight on the polymer of a water-soluble neutral salt of an alkali metal as conditioning electrolyte, the pH of the bath being below 7.

2. A bath for treating wool as set forth in claim 1, in which the polymer is a homobutadiene polymer.

3. A bath for treating wool as set forth in claim 1, in which the polymer is a butadiene-butyl methacrylate copolymer in the ratio of 40:10 parts by weight.

4. A bath for treating wool as set forth in claim 1, in which the polymer is a butadiene-styrene copolymer in the ratio of 45:5 parts by weight.

5. A bath as set forth in claim 1, which contains an amount of antioxidant of from 1 to 5% on the weight of the polymer sufficient to enhance the shrinkproofing effect.

JOHN B. RUST.

REFERENCES CITED

The following references are of record in the file of this patent:

UNITED STATES PATENTS

| Number | Name | Date |
|---|---|---|
| 1,726,905 | Lahey | Sept. 3, 1929 |
| 1,814,420 | Tochtermann et al. | July 14, 1931 |
| 1,864,078 | Luther et al. | June 21, 1932 |
| 1,967,861 | Collins | July 24, 1934 |
| 2,234,076 | Gumlich et al. | Mar. 4, 1941 |
| 2,255,834 | Taylor et al. | Sept. 16, 1941 |
| 2,340,357 | Young | Feb. 1, 1944 |
| 2,340,358 | Young | Feb. 1, 1944 |
| 2,416,232 | Soday | Feb. 18, 1947 |